(12) United States Patent
Steubler

(10) Patent No.: US 8,800,406 B2
(45) Date of Patent: Aug. 12, 2014

(54) TRANSMISSION SERIES

(75) Inventor: Thomas Steubler, Lugau (DE)

(73) Assignee: Siemens Aktiengesellschaft, München (DE)

( * ) Notice: Subject to any disclaimer, the term of this patent is extended or adjusted under 35 U.S.C. 154(b) by 128 days.

(21) Appl. No.: 13/598,049

(22) Filed: Aug. 29, 2012

(65) Prior Publication Data

US 2013/0228043 A1   Sep. 5, 2013

(30) Foreign Application Priority Data

Aug. 30, 2011   (EP) .................................... 11179363

(51) Int. Cl.
*F16H 37/06* (2006.01)

(52) U.S. Cl.
USPC .................... 74/665 T; 74/665 S; 74/730.1

(58) Field of Classification Search
USPC .................. 74/665 G, 665 S, 665 T, 730.1
See application file for complete search history.

(56) References Cited

U.S. PATENT DOCUMENTS

| | | | | |
|---|---|---|---|---|
| 3,975,990 | A * | 8/1976 | Kraus | 92/57 |
| 6,470,771 | B2 * | 10/2002 | Nanri et al. | 74/733.1 |
| 8,306,707 | B2 * | 11/2012 | Zhang et al. | 701/51 |
| 2001/0037697 | A1 * | 11/2001 | Nanri et al. | 74/335 |

FOREIGN PATENT DOCUMENTS

| | | |
|---|---|---|
| DE | 10 2007 004 964 A1 | 8/2008 |
| DE | 10 2007 004 965 A1 | 8/2008 |
| WO | WO2008/089829 A1 | 7/2008 |
| WO | WO2008/089830 A1 | 7/2008 |

* cited by examiner

*Primary Examiner* — Ha D Ho
(74) *Attorney, Agent, or Firm* — Henry M Feiereisen LLC

(57) ABSTRACT

In a transmission series different versions of lubricant supply pumps have a uniformly designed and dimensioned coupling pin between lubricant supply pump and transmission drive shaft or take-off shaft. In addition different versions of lubricant supply pumps have a uniformly designed and dimensioned mechanical interface on their drive shaft-side housing end face side. This mechanical interface includes a centering shoulder radially surrounding the coupling pin and a circle of holes concentric to the centering shoulder provided with threaded holes for attachment screws on the drive shaft-side end face side of the lubricant supply pump.

10 Claims, 4 Drawing Sheets

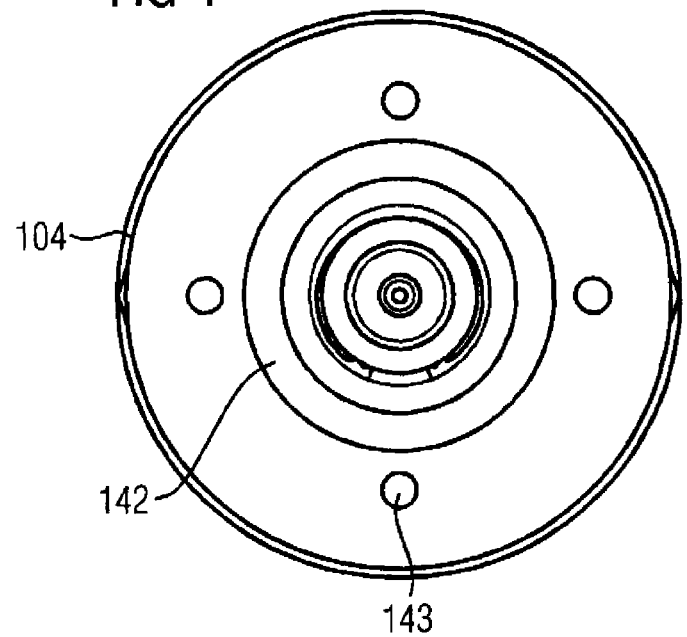
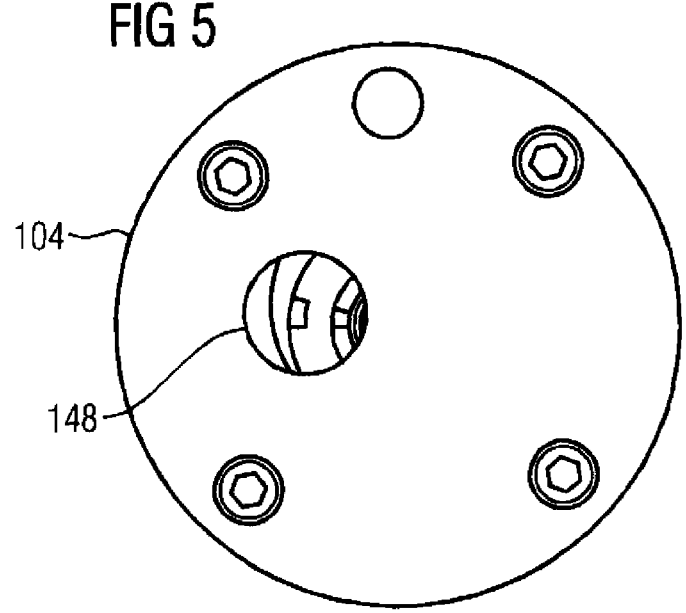

TRANSMISSION SERIES

CROSS-REFERENCES TO RELATED APPLICATIONS

This application claims the priority of European Patent Application, Serial No. EP 11179363.4, filed Aug. 30, 2011, pursuant to 35 U.S.C. 119(a)-(d), the content of which is incorporated herein by reference in its entirety as if fully set forth herein.

BACKGROUND OF THE INVENTION

The present invention relates to a transmission series.

The following discussion of related art is provided to assist the reader in understanding the advantages of the invention, and is not to be construed as an admission that this related art is prior art to this invention.

German Patent document DE 10 2007 004 964 A1 describes a transmission series having a lubricating oil pump arranged outside a transmission housing. The lubricating oil pump has two pressure connections and one induction connection. The two pressure connections are disposed on opposite end face sides of the lubricating oil pump and, depending on the variant of the lubricating oil pump, make it possible to connect one of the two pressure lines to a pipe system within the transmission or to external pipes.

German Patent document DE 10 2007 004 965 A1 describes transmission series having a lubricating oil pump which in accordance with a first variant is installed on a bearing cover outside a transmission housing. In this case the lubricating oil pump is connected via the bearing cover to oil circulation pipes within the transmission housing. In accordance with a second variant, a lubricating oil pump identical in design to the first variant is provided, which is installed on a cover of the transmission housing. In this case the lubricating oil pump is connected to a partly external pipe system however, which includes an oil filter and an oil cooler and is also connected to an internal pipe system.

In addition to external variants of lubricating oil pumps, built-in variants also exist. Lubricating oil pumps disposed within a transmission housing require an adaptation of the pump housing, so as to permit installation in a bearing hole within a transmission. Adapting pump housings is extremely complex. If a lubricating oil pump is additionally to have both an external variant and also a built-in variant, adapter systems are required, which include a plurality of adapter elements. This represents a significant cost factor.

It would therefore be desirable and advantageous to provide an improved transmission series to obviate prior art shortcomings and to enable a simple and low-cost adaptation of lubricant supply pumps in respect of their connection on and within different transmission variants.

SUMMARY OF THE INVENTION

According to one aspect of the present invention, a transmission series includes a plurality of transmissions, each transmission at least two toothed wheels meshing with one another of which the assigned shafts are supported in a transmission housing surrounding the at least two toothed wheels. In addition each transmission has a drive shaft and take-off shaft passing through the transmission housing. Furthermore a lubricant supply pump is provided in each case, comprising an essentially cylindrical pump housing. A drive shaft of the lubricant supply pump is connected in a torque-proof manner to the drive or take-off shaft of the transmission. Advantageously, the drive shaft of the lubricant supply pump is connected hereby to the shaft moving faster or is connected to the shaft of which the speed best matches the rated speed of the lubricant supply pump. Arranged between the drive shaft of the lubricant supply pump and the drive or take-off shaft of the transmission in each case is a coupling element screwed or glued to the drive shaft or take-off shaft, the pump-side end of which has a slot. A coupling pin formed onto a free end of the drive shaft of the lubricant supply pump engages into the slot, making a positive fit.

According to the present invention, at least two lubricant supply pumps of different design have a uniformly structured and dimensioned coupling pin. In addition at least two lubricant supply pumps of different design have a uniformly structured and dimensioned mechanical interface on their drive shaft-side end face housing side. This mechanical interface comprises a centering shoulder radially surrounding the coupling pin and a circle of holes concentric to this provided with threaded holes for attachment screws on the drive shaft-side housing end face side of the lubricant supply pump.

At least one first transmission variant of the transmission series according to the present invention has a housing hole concentric to the drive shaft or take-off shaft of which the diameter corresponds to the outer diameter of the centering shoulder on a lubrication supply pump of at least one selected version. In this case the lubricant supply pump is installed in the area of the housing hole externally on the transmission housing. By contrast, at least one second transmission variant of the transmission series according to the invention has a bearing seat hole concentric to the drive shaft or take-off shaft, of which the diameter corresponds to the outer diameter of the pump housing of a lubricant supply pump of the at least one selected version. In this case the lubricant supply pump is installed in the bearing seat hole within the transmission housing.

The uniform mechanical interface of the lubrication supply pump enables this to be used in accordance with the invention both in a built-in variant and also in an externally-mounted variant. This type of modular system makes a significant cost reduction possible. To this end pump housing, pump elements and also coupling elements and adapter elements assigned to the lubricant supply pump preferably follow a size system and thereby form a series. Furthermore the mechanical interface with the uniformly designed and dimensioned coupling pin and the associated slotted coupling element make simple and rapid installation of the lubricant supply pump possible. With the at least one second transmission variant the drive shaft or take-off shaft of the transmission, in accordance with an advantageous development of the present invention, can be supported by the lubricant supply pump. In this way the lubricant supply pump can be used as a support element for axial forces.

According to another advantageous feature of the present invention, a sealing ring can be disposed between the bearing seat hole of the at least one second transmission variant and a jacket of the pump housing.

According to another advantageous feature of the present invention, a centering band can be formed all around the pump housing jacket with a recess for fixing the sealing ring. This makes an especially simple assembly of the lubricant supply pump possible with a built-in variant of the transmission series.

According to another advantageous feature of the present invention, in the at least one second transmission variant the diameter of the bearing seat hole concentric to the drive shaft or take-off shaft can correspond to the external diameter of an adapter shim or an adapter ring on the pump housing of a lubricant supply pump of a second version. In this case the lubricant supply pump is installed in the bearing seat hole within the transmission housing by means of the adapter shim or the adapter ring. This results in a further improved reusability of machine elements for different transmission variants within a transmission series. In a corresponding way at least a third transmission variant can have a bearing seat hole concentric to the drive or take-off shaft for this purpose, the diameter of which corresponds to the external diameter of an adapter shim or of an adapter ring on the pump housing of a lubricant supply pump of the at least one selected version. Here the lubricant supply pump is installed in the bearing seat hole within the transmission housing by means of the adapter shim or the adapter ring.

According to another advantageous feature of the present invention, the lubricant supply pump can have two pressure connections and one induction connection to connect the lubricant supply pump within the transmission housing and outside the transmission housing. This makes it easy to use lubricant supply pumps both in a built-in variant and also in an external variant.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows a diagram of a first end face side of the lubricant supply pump in accordance with FIG. 3; and FIG. 5 shows a diagram of a second end face side of the lubricant supply pump in accordance with FIG. 3.

DETAILED DESCRIPTION OF PREFERRED EMBODIMENTS

Figure 1:
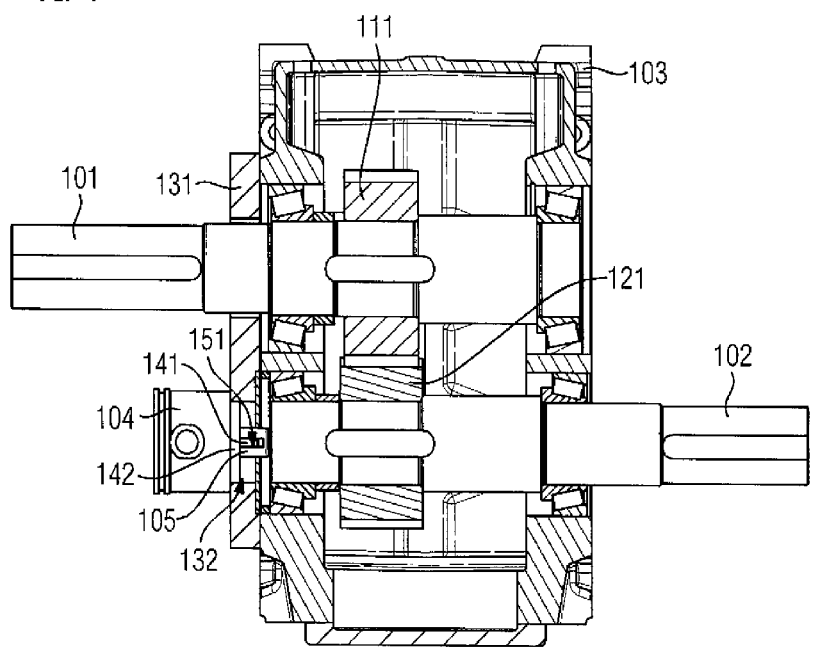
FIG. 1 shows a cross-sectional diagram of a first transmission variant of a transmission series with a lubricant supply pump installed outside a transmission housing.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross-sectional diagram of a first transmission variant of a transmission series according to the present invention, including a drive shaft 101 and a take-off shaft 102 passing through a transmission housing 103. Connected to the drive shaft 101 by a torque-proof connection is a toothed wheel 111, which meshes with a toothed wheel 121 connected to the take-off shaft 102 by a torque-proof connection.

The transmission housing 103 has a number of bearing seats for bearings assigned to the drive shaft 101 and the take-off shaft 102.

The transmission housing 103 of the first transmission variant comprises a housing cover 131 with a housing hole 132 concentric to the take-off shaft 102, of which the diameter corresponds to the external diameter of a centering shoulder 142 on a lubricant supply pump 104. In this case the lubricant supply pump 104 is installed in the area of the housing hole 132 on the outside of the transmission housing.

The lubricant supply pump 104 comprises an essentially cylindrical pump housing. A drive shaft of the lubricant supply pump 104 has a torque-proof connection to the take-off shaft 102 of the transmission. Disposed between the drive shaft of the lubricant supply pump 104 and the take-off shaft 102 of the transmission is a coupling element 105 screwed to the take-off shaft 102, the pump-side end of which has a slot 151 (see also FIG. 3). A coupling pin 141 formed onto a free end of the drive shaft of the lubricant supply pump engages into this slot 151, making a positive fit. With a drive shaft moving at high speed 101 or a step-down transmission the lubricant supply pump 104 in an alternate embodiment of the present invention can also have a torque-proof connection to the drive shaft 101 and accordingly be arranged within the transmission housing 103.

Figure 2:
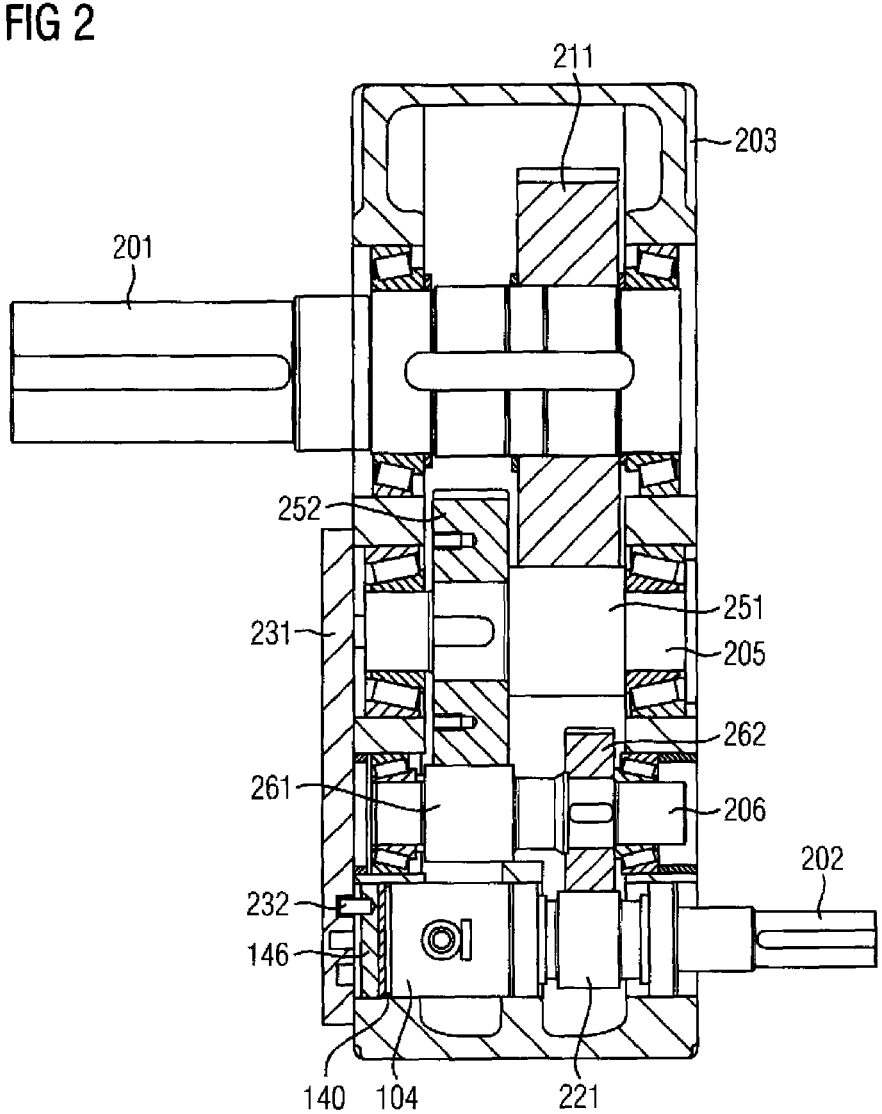
FIG. 2 shows a cross-sectional diagram of a second transmission variant of a transmission series with a lubricant supply pump installed inside a transmission housing.

The second transmission variant of the inventive transmission series shown in FIG. 2 also has a drive shaft 201 and a take-off shaft 202 passing through a transmission housing 203. In addition two intermediate shafts 205, 206 are each provided with a sprocket 251, 261 and a toothed wheel 252, 262. A toothed wheel 211 has a torque-proof connection to the drive shaft 201, which meshes with the sprocket 251 of a first intermediate shaft 205. The toothed wheel 252 of the first intermediate shaft 205 engages with the sprocket 261 of the second intermediate shaft 206, of which the toothed wheel 262 meshes with a sprocket 221, which has a torque-proof connection to the take-off shaft 202. Like the first transmission variant the transmission housing 203 of the second transmission variant has a number of bearing seats for the bearings assigned to the drive shaft 201, the take-off shaft 202 and the intermediate shafts 205-206.

The transmission housing 203 of the second transmission variant comprises a housing cover 231, which closes off a total of three housing openings concentric to the bearing seat holes. To this end a housing opening counts as a bearing set hole concentric to the take-off shaft 202, the diameter of which corresponds to the external diameter of a pump housing of a lubricant supply pump 104, which is installed in this bearing seat hole within the transmission housing 203. The lubricant supply pump 104 installed within the transmission housing 203 in this case is the same as in the first transmission variant and thus likewise comprises an essentially cylindrical pump housing. In the present exemplary embodiment a sealing ring 140 is disposed between bearing seat hole and pump housing jacket.

In the second transmission variant too, a drive shaft of the lubricant supply pump 104 also has a torque-proof connection to the take-off shaft 202 of the transmission. Disposed between the drive shaft of the lubricant supply pump 104 and the take-off shaft 202 of the transmission is a coupling element 105 screwed to the take-off shaft 202, the pump-side end of which has a slot 151 (see FIG. 3). As with the first transmission variant, a coupling pin 141 formed onto a free end of the drive shaft engages into this slot 151, making a positive fit. Like the first transmission variant, with a drive shaft 201 moving at high speed or a step-down transmission, the lubricant supply pump 104 can also have a torque-proof connection to the drive shaft 201.

With the second transmission variant, in the present exemplary embodiment a pump cover 146 is installed on an end face side facing away from the take-off shaft 202 of the transmission. The pump cover 146 has a hole 147, into which for connection with the housing cover 231 a connecting pin is inserted as an anti-torque facility 232 (see also FIG. 3). In addition, with the pump cover 146, a pressure connection 148 shown in FIG. 5 on the end face side of the lubricant supply pump 104 facing away from the take-off shaft 202 of the transmission is open, while a pressure connection 149 disposed on a jacket surface of the lubricant supply pump 104 is closed.

Figure 3:
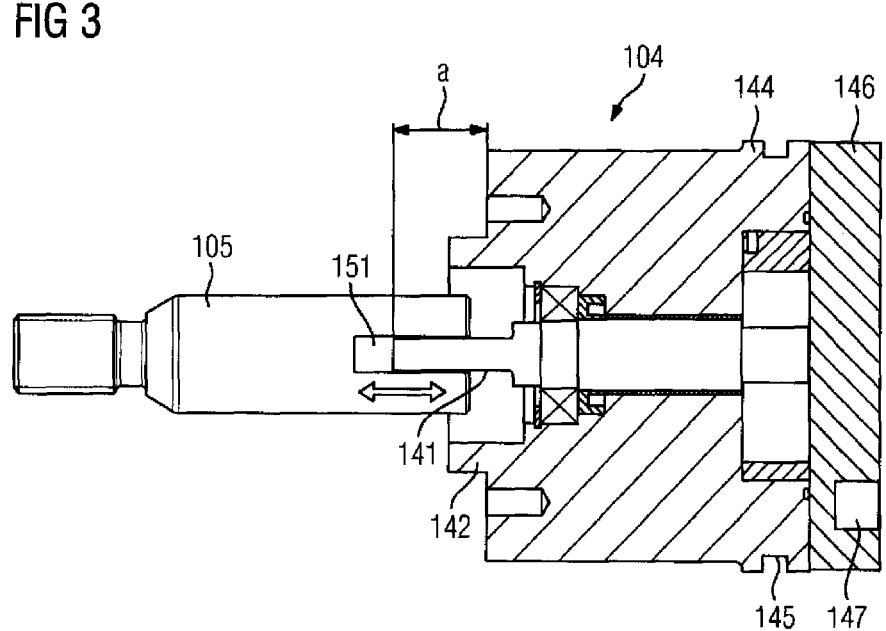
FIG. 3 shows a simplified cross-sectional diagram of a lubricant supply pump for use both for the first transmission variant and also for the second transmission variant.

Different versions of lubricant supply pumps 104 also have a uniformly designed and dimensioned coupling pin 141 in accordance with FIG. 3. In addition all lubricant supply pumps 104 have a uniformly designed and dimensioned mechanical interface on their drive shaft-side first housing end face side. This mechanical interface comprises a centering shoulder 142 radially surrounding the coupling pin 141 and a circle of holes concentric with this, provided with threaded holes 143 for attachment screws on the first housing end face side of the lubricant supply pump (see also FIG. 4).

In accordance with FIG. 3 a circumferential centering band 144 with a recess 145 for fixing the sealing ring used in the second transmission variant is formed onto the pump housing jacket of the lubricant supply pump 104. This sealing ring can for example additionally also serve to separate induction and pressure side of the lubricant supply pump 104. Two pressure connections and one induction connection are advantageously provided on each lubricant supply pump 2 for connecting the pump within the transmission housing and outside the transmission housing. One pressure connection 148 is located in the present exemplary embodiment on the second end face side of the lubricant supply pump 104 and, in the second transmission variant shown in FIG. 2, is used for connection within the transmission housing. Lubricant to be conveyed from a transmission housing side sump via lines or via the channels integrated into the transmission housing is conveyed and distributed via the induction connection and a pressure connection activated depending on transmission variant.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transmission series, comprising a plurality of transmissions, each transmission comprising:
   a transmission housing,
   at least two toothed wheels surrounded by the transmission housing and meshing with one another, said toothed wheels respectively mounted on shafts which are supported in the transmission housing,
   a drive shaft and an take-off shaft which are configured to pass through the transmission housing,
   a lubricant supply pump including an essentially cylindrical pump housing and a drive shaft which has a torque-proof connection to a member selected from the group consisting of the drive shaft and the take-off shaft of the transmission,
   a coupling element screwed to or glued to the member and disposed between the drive shaft of the lubricant supply pump and the member, said coupling element having a pump-side end which has a slot for form-fitting engagement of a coupling pin formed onto a free end of the drive shaft of the lubricant supply pump,
   wherein the coupling pin of the lubricant supply pump of one of the transmissions and the coupling pin of the lubricant supply pump of another one of the transmissions of a different configuration are uniformly designed and dimensioned,
   wherein the lubricant supply pump of one of the transmissions and the lubricant supply pump of another one of the transmissions of a different configuration have each a drive shaft-side housing end face side with a uniformly designed and dimensioned mechanical interface which includes a centering shoulder radially surrounding the coupling pin and a circle of holes arranged in concentric relationship to the centering shoulder and provided with threaded holes for attachment screws on the drive shaft-side housing end face side of the lubricant supply pump,
   wherein the transmissions are configured in at least two ways,
      a first way in which at least one of the transmissions has a housing hole in concentric relationship to the member, said housing hole having a diameter which corresponds to an external diameter of the centering shoulder of a selected one of a first type of the lubricant supply pumps, with the selected one of the first type of lubricant supply pumps being mounted in an area of the housing hole externally on the transmission housing,
      a second way in which at least one the transmissions has a bearing seat hole in concentric relationship to the member, said bearing seat hole having a diameter which corresponds to an external diameter of the pump housing of the selected one of the first type of the lubricant supply pumps, with the selected one of the first type of lubricant supply pumps being mounted in the bearing seat hole within the transmission housing.

2. The transmission series of claim 1, further comprising a sealing ring disposed between the bearing seat hole of the at least one transmission of the second way and a jacket of the pump housing.

3. The transmission series of claim 2, further comprising a circumferential centering band formed onto the pump housing jacket and having a recess for fixing the sealing ring.

4. The transmission series of claim 1, wherein the diameter of the bearing seat hole of the at least one transmission configured in the second way corresponds to an external diameter of an adapter on the pump housing of a selected one of a second type of the lubricant supply pumps, with the selected one of the second type of the lubricant supply pumps being mounted in the bearing seat hole within the transmission housing by the adapter.

5. The transmission series of claim 4, wherein the adapter is configured in the form of an adapter shim or an adapter ring.

6. The transmission series of claim 1, wherein at least one of the transmissions is configured in a third way in which the at least one of the transmissions has a bearing seat hole arranged in concentric relationship to the member and having a diameter which corresponds to an external diameter of an adapter on the pump housing of a selected one of the first type of the lubricant supply pumps, with the selected one of the first type of lubricant supply pumps being mounted in the bearing seat hole within the transmission housing by the adapter.

7. The transmission series of claim 6, wherein the adapter is configured in the form of an adapter shim or an adapter ring.

8. The transmission series of claim 1, wherein the lubricant supply pump has two pressure connections and one induction connection to connect the lubricant supply pump to an inside of the transmission housing or to an outside of the transmission housing.

9. The transmission series of claim 1, wherein the pump housing, pump elements and coupling elements and adapter elements assigned to the lubricant supply pump follow a size system to thereby form a series.

10. The transmission series of claim 1, wherein the pump housing or a pump cover in the at least one transmission configured in the second way includes a hole into which a connecting pin is inserted as an anti-torque facility for connection with a housing cover of the transmission housing.

\* \* \* \* \*